UNITED STATES PATENT OFFICE.

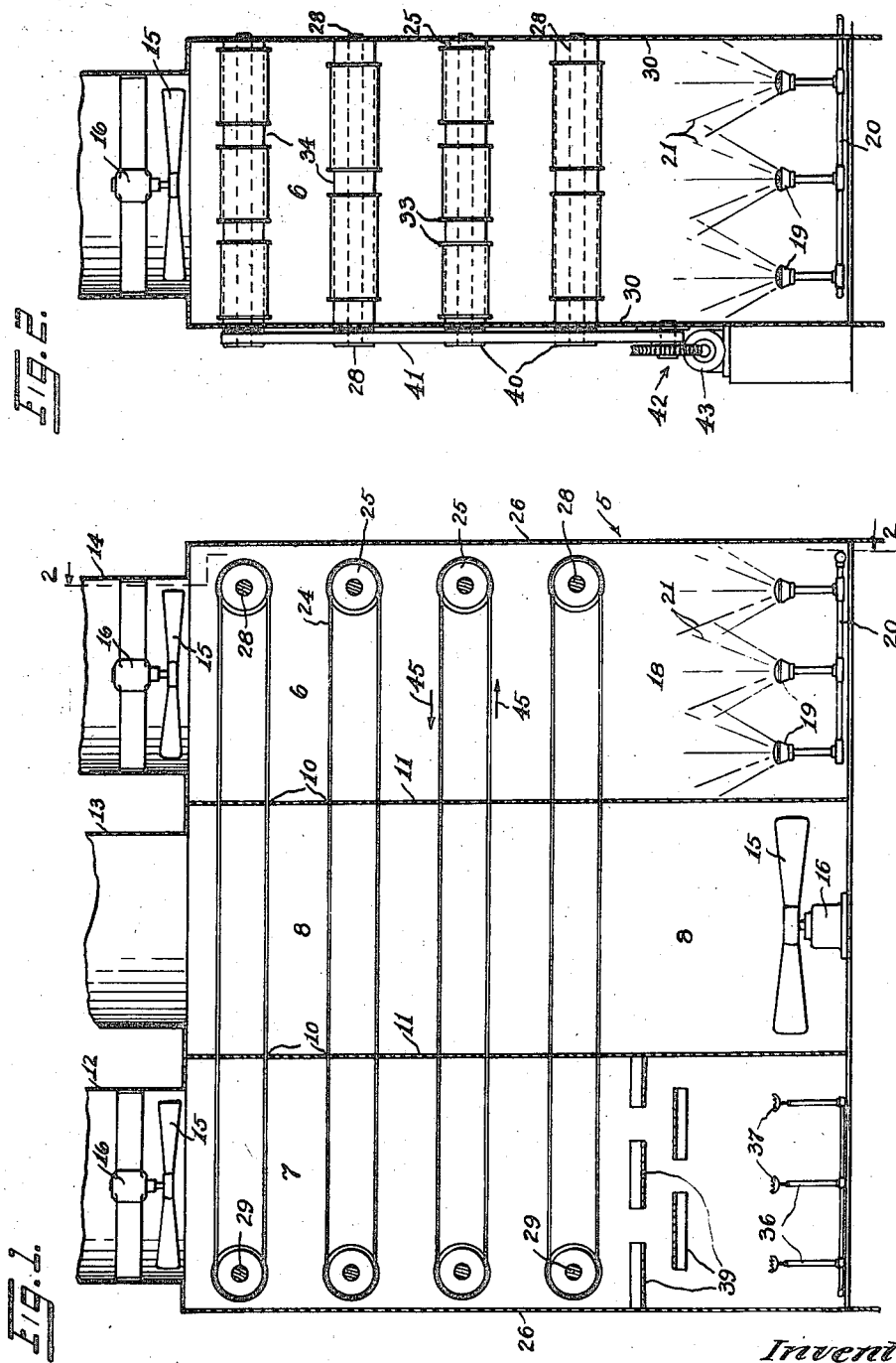

BERNARR MACFADDEN, OF NEW YORK, N. Y.

AIR-DRIER.

1,322,804.  Specification of Letters Patent.  Patented Nov. 25, 1919.

Application filed March 25, 1919. Serial No. 284,891.

*To all whom it may concern:*

Be it known that I, BERNARR MACFADDEN, a citizen of the United States, residing in New York city, in the county of New York and State of New York, have invented certain new and useful Improvements in Air-Driers, of which the following is a specification.

This invention relates to ventilating and air cooling apparatus, and to apparatus for eliminating moisture from air or other gases.

One object of the invention is to provide an improved means for holding down the moisture content of cooling and ventilating air which has been cooled by a water-spray in a cooling and ventilating apparatus of the water-spray type.

Other objects of the invention will appear as the description proceeds; and while I describe the details of the invention, it is noted that the invention is not limited to these, since various changes may be made without departing from the scope of the invention as claimed.

In the accompanying drawings,—

Figure 1 is a longitudinal vertical sectional view from an apparatus embodying my invention; and Fig. 2 is a sectional view taken on the line 2—2, of Fig. 1.

The improved apparatus comprises a casing 5 provided with walls forming an eliminating chamber 6, a drying chamber 7, and a cooling chamber 8 disposed between the eliminating and drying chambers and provided in its walls with horizontal slots 10 in the end walls 11 separating the cooling chambers from the other chambers. All of said chambers are open at the bottom and top, and are provided at the top with conduit pipes 12, 13, and 14, leading from the top of the chambers respectively.

The pipe 14 leads to the room or the like which is to be cooled. The conduit pipes 12 and 13 are for warm waste air, and may conduct such air to the outside of the building or to any place where such waste air can be utilized. Fans 15 driven by suitable motors 16 or the like are placed in the conduits 12 and 14 and in the lower part of the cooling chamber 8, for creating currents of air passing upwardly through all of said chambers respectively.

The lower part of the eliminating chamber 6 forms the spray chamber 18 in which are placed a plurality of spray nozzles fed by pipes 20 from any suitable water supply, said nozzles being adapted to throw water sprays 21 up into the spray chamber for cooling the air passing therethrough.

In order to hold down the moisture content of the spray cooled air to the desired extent, special eliminators 24 comprising endless belts of absorbent felt or other material are provided. These belts are horizontally disposed in said chambers and pass through said slots 10 and are supported upon horizontally disposed rollers 25 rotatably mounted one above the other near the outer end walls 26 of the eliminating and drying chambers. These rollers are each provided with journal shafts 28 and 29 passing through the side walls 30 of the apparatus. Annular flanges are fixed on said rollers for holding the belts in staggered relation (Fig. 2) to the belts immediately above and below, so that the openings 34 between the belts will cause the air passing upwardly through the spray chamber to take a meandering path through the eliminating chamber, so as to bring the sprayed air as much into contact with the moisture eliminating belts as possible, in order that the minimum amount of moisture may remain in the air unabsorbed.

Special means are provided for extracting the moisture from the belts 24 in order to prevent the belts becoming so saturated that they will no longer take up the required amount of moisture. For accomplishing this extraction, there are provided in the lower part of the drying chamber, suitable air-heating and drying means, for instance, a plurality of gas flame-burners 36 adapted to provide drying flames 37 in the lower part of the chamber, so that the air may be heated and dried as it passes up into contact with the belts 24. This heating and drying enables the heated and dried air thoroughly to extract the moisture from the belts before again introducing them to the eliminating chamber.

A plurality of staggered baffle plates 39 secured to the side walls of the apparatus and disposed just above the heating flames protect the lower belts 24 from excessive heat.

Upon the outer ends of the shafts 28 are provided pulleys adapted to receive a drive belt 41 passed around a small drive pulley provided on the reducing gear 42, driven from a suitable motor 43. By this means, the belts 24 are caused to travel continuously in the direction of the arrows 45 of Fig. 1, so that the moisture laden belt passes from the eliminating chamber through the cooling chamber to the drying chamber, where it is dried as above explained.

After the belt has been dried in the drying chamber it proceeds to the cooling chamber 8, where a cooling current of air from the fan therein cools the belt and removes therefrom any excessive heat received in the drying chamber before it passes on into the eliminating chamber, where it again absorbs moisture from the air. The cycle is then repeated as long as desired.

The operation of the apparatus will be readily understood from the foregoing and need now briefly be summarized as follows:

Currents of air continually pass upwardly through all of the chambers under the influence of fans 15. The air then introduced at the bottom of the spray chamber is cooled by the sprays 21 and passes upwardly to the eliminating belts 24, where the moisture is eliminated therefrom, and the air then passes on through the conduit pipe 14 to the room or building to be cooled and ventilated. The moisture laden belt then passes through the eliminating chamber and drying chamber, where it is dried by the flame-heated air, and then passes into and is cooled in the cooling chamber 8, and then returns to the eliminating chamber to repeat the cycle. The water from the sprays 21 may be conducted away or repeatedly used by any suitable or well-known device.

I claim as my invention:

1. In an apparatus of the character described, the combination of an eliminating chamber; a drying chamber; means for causing the passage of a current of air through said eliminating chamber; and endless belts of absorbent material disposed in said chambers and passing from one to the other.

2. In an apparatus of the character described, the combination of a moisture eliminating chamber; a separate drying chamber; and endless belts of absorbent material disposed in said chambers one above the other.

3. In an apparatus of the character described, the combination of an eliminating chamber; a drying chamber provided with openings in its wall communicating with said eliminating chamber; and movable absorbent members disposed in said chambers and passing from one to the other through said openings.

4. In an apparatus of the character described, the combination of an eliminating chamber; a drying chamber provided with openings in its wall communicating with said eliminating chamber; rotary rollers rotatably mounted in said chambers respectively; and endless belts of absorbent material disposed in said chambers and carried on said rollers, and passing through said openings.

5. In an apparatus of the character described, the combination of an eliminating chamber; a drying chamber; horizontally disposed rotary rollers rotatably mounted one above the other in said chambers respectively; and endless belts of absorbent material horizontally disposed one above the other in staggered relation in said chambers and carried on said rollers, and passing through said slots.

6. In an apparatus of the character described, the combination of an eliminating and spray chamber; a drying chamber provided with slots in its inner wall communicating with said eliminating chamber; horizontally disposed rotary rollers rotatably mounted one above the other near the outer wall of said eliminating and drying chambers respectively; endless belts of absorbent material horizontally disposed in said chambers and carried on said rollers, and passing through said slots; and means on rollers for holding said belts respectively in staggered relation to the belts immediately above and below.

7. In an apparatus of the character described, the combination of a plurality of air treating chambers; and endless belts of absorbent material disposed in said chambers in staggered relation to the belts immediately above and below.

8. In an apparatus of the character described, the combination of an eliminating chamber; a drying chamber; a cooling chamber between said eliminating and drying chambers; air heating and drying means disposed in the lower part of said drying chamber; and endless belts of absorbent material horizontally disposed in said chambers and above said heating means and disposed in staggered relation to the belts immediately above and below.

9. In an apparatus of the character described, the combination of an eliminating chamber; a drying chamber; a heating and drying flame-burner disposed in the lower part of said drying chamber and adapted to supply a current of heated air to said drying chamber; an absorbent moisture eliminating belt in the eliminating chamber and adapted to pass thence to the drying chamber and then back to the eliminating chamber and horizontally disposed staggered baffle plates above said burner and below said belt.

10. In an apparatus of the character described, the combination of an eliminating chamber; a drying chamber open at its lower end; a plurality of air heating and drying flame-burners disposed in the lower part of said drying chamber and adapted to supply a current of heated air to said drying chamber; an absorbent moisture eliminating member in the eliminating chamber and adapted to pass thence to the drying chamber and then back to the eliminating chamber; and horizontally disposed staggered baffle plates above said burners and below said eliminating member.

11. In an apparatus of the character described, the combination of an eliminating chamber; a cooling chamber; a drying chamber; and a moisture-eliminating member adapted to pass from the eliminating chamber to the drying chamber, thence to the cooling chamber, and then back to the eliminating chamber.

12. In an apparatus of the character described, the combination of a cooling chamber; a drying chamber; and an absorbent moisture-eliminating member adapted to pass to the drying chamber, thence to the cooling chamber, and then back to the drying chamber.

13. In an apparatus of the character described the combination of an eliminating and spray chamber; a cooling chamber; a drying chamber; and an absorbent moisture-eliminating member adapted to pass from each of said chambers to the other chambers.

14. In an apparatus of the character described, the combination of an eliminating and spray chamber; a cooling chamber; a drying chamber; and an absorbent moisture-eliminating member in the eliminating and spray chamber and adapted to pass thence to the drying chamber, thence to the cooling chamber, and then back to the eliminating chamber.

15. In an apparatus of the character described, the combination of an eliminating chamber; spray nozzles in the chamber; and a moisture eliminating member in the eliminating and spray chamber just above said sprays and adapted to pass thence to give up moisture, and then back into the eliminating chamber.

16. In an apparatus of the character described, the combination of an eliminating chamber open at its lower end; a fan disposed in the upper part of said eliminating chamber; moistening means in the eliminating chamber; moisture eliminating means adapted to pass out of and then back into the eliminating chamber; and means for extracting moisture from the eliminating means.

17. In an apparatus of the character described, the combination of a vertically disposed eliminating chamber open at its lower end; a conduit pipe leading from the upper part of said chamber; a motor driven fan disposed in the conduit pipe; spray nozzles in the lower part of said eliminating chamber and adapted to throw sprays of water up into said chamber; a drying chamber; and an absorbent moisture eliminating member in the eliminating chamber just above said sprays and adapted to pass thence to the drying chamber, and then back to the eliminating chamber.

18. In an apparatus of the character described, the combination of an eliminating chamber; a cooling chamber adjacent to said eliminating chamber; means adapted to force a drying current of air through said cooling chamber; and an absorbent moisture eliminating member in the eliminating and spray chamber and to pass to the cooling chamber, and then back to the eliminating chamber.

19. In an apparatus of the character described, the combination of a drying chamber; a cooling chamber adjacent to said drying chamber and open at its lower end and provided with horizontal slots in its walls for establishing communication with said drying chamber; means adapted to force a drying current of air through said cooling chamber; and an absorbent member adapted to pass through said slots to the drying chamber and thence to the cooling chamber.

20. In an apparatus of the character described, the combination of an eliminating chamber; a drying chamber; a cooling chamber between said eliminating and drying chambers and open at its lower end and provided with horizontal slots in its walls for establishing communication with said eliminating and said drying chambers; a fan adapted to force a drying current of air through said cooling chamber; and an absorbent moisture eliminating member in the eliminating and spray chamber and adapted to pass thence through said slots to the drying chamber, thence to the cooling chamber and then back to the eliminating chamber.

21. In an apparatus of the character described, the combination of an eliminating and spray chamber; a drying chamber open at its lower end; a cooling chamber between said eliminating and drying chambers and open at its lower end and provided with horizontal slots in its walls for establishing communication with said eliminating and said drying chambers; a waste air conduit leading from the upper end of the cooling chamber; a motor driven fan in the lower part of said cooling chamber and adapted to force a drying current of air through said chamber and out of said conduit; and an absorbent moisture eliminating member in the eliminating a spray chamber and adapted to pass thence through said slots to the drying chamber, thence to the cooling chamber, and then back to the eliminating chamber.

22. In an apparatus of the character described, the combination of an eliminating chamber; a cooling chamber; a drying chamber open at its lower end; a fan in the lower part of said drying chamber; a plurality of air heating and drying flame-burners disposed in the lower part of said drying chamber and adapted to supply a current of heated air to said drying chamber; horizontally disposed staggered baffle plates above said burners; and an absorbent moisture eliminating member in the eliminating and spray chamber and adapted to pass thence to the drying chamber, thence to the cooling chamber, and then back to the eliminating chamber.

23. In an apparatus of the character described, the combination of eliminating and drying chambers; rollers rotatably mounted in said chambers respectively; endless belts of absorbent material disposed in said chambers and and on said rollers; and annular flanges on said rollers for holding said belts respectively in staggered relation.

24. In an apparatus of the character described, the combination of an eliminating and spray chamber; a drying chamber provided with slots in its inner wall communicating with said eliminating chamber; horizontally disposed rotary rollers rotatably mounted one above the other near the outer wall of said eliminating and drying chambers respectively; endless belts of absorbent material horizontally disposed in said chambers and carried on said rollers, and passing through said slots; and annular flanges on rollers for holding said belts respectively in staggered relation to the belts immediately above and below.

25. In an apparatus of the character described, the combination of an eliminating chamber; a drying chamber communicating with said eliminating chamber; horizontally disposed rotary rollers rotatably mounted one above the other in said chambers respectively; staggered endless belts of absorbent material horizontally disposed in and passing from one to the other of said chambers and carried on said rollers; journal shafts secured to certain of said rollers and projecting through a wall of the chamber; pulleys on said journal shafts; and a drive belt engaging said pulleys for rotating the same.

26. In an apparatus of the character described, the combination of an eliminating chamber; a drying chamber; a cooling chamber between said eliminating and drying chambers; means for causing the passage of a current of air upwardly through all of said chambers; spray means to throw sprays of water up into said eliminating chamber; air heating and drying means disposed in the lower part of said drying chamber; and endless belts of absorbent material horizontally disposed in said chambers above said spray and heating means and disposed in staggered relation to the belts immediately above and below.

27. In an apparatus of the character described, the combination of an eliminating chamber; a drying chamber; a cooling chamber between said eliminating and drying chambers and provided with openings in its walls for establishing communication with said eliminating and said drying chambers; means for causing the passage of air upwardly through all of said chambers; spray means to throw sprays of water up into said eliminating chamber; air heating and drying means disposed in the lower part of said drying chamber and adapted to heat the current of air in said drying chamber; baffles disposed above said heating and drying means; horizontally disposed rollers rotatably mounted one above the other near the outer wall of said eliminating and drying chambers respectively; and endless belts of absorbent material horizontally disposed in said chambers above said spray and heating means and passing through said openings and disposed in staggered relation to the belts immediately above and below.

28. In an apparatus of the character described, the combination of a vertically disposed eliminating chamber; a vertically disposed drying chamber; a cooling chamber between said eliminating and drying chambers, and provided with horizontal slots in its walls for establishing communication with said eliminating and said drying chambers; all of said chambers being open at the lower end; conduit pipes leading from the upper part of said chambers respectively; a motor driven fan disposed in the conduit pipes leading from said eliminating and drying chambers; spray nozzles in the lower part of said eliminating chamber and adapted to throw sprays of water up into said chamber; a motor driven fan in the lower part of said cooling chamber and adapted to force a drying current of air through said chamber; a plurality of air heating and drying flame-burners disposed in the lower part of said drying chamber and adapted to supply a current of heated air to said drying chamber; horizontally disposed staggered baffle plates disposed above said burner-flames; horizontally disposed rotary rollers mounted one above the other near the outer wall of said eliminating and drying members respectively, higher than said sprays and said burners; endless belts of absorbent material horizontally disposed in said chambers in planes one above the other, and passing through said slots; and annular flanges on said rollers for holding said belts in staggered relation to the belts immediately above and below.

BERNARR MACFADDEN.

Witnesses:
B. E. Damson,
E. R. Leeser.